(12) United States Patent
Ohta (10) Patent No.: US 7,954,600 B2
(45) Date of Patent: Jun. 7, 2011

(54) CRANKSHAFT LUBRICATION SYSTEM

(75) Inventor: Nobuyuki Ohta, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 818 days.

(21) Appl. No.: 11/987,125

(22) Filed: Nov. 27, 2007

(65) Prior Publication Data
US 2008/0190699 A1    Aug. 14, 2008

(30) Foreign Application Priority Data

Feb. 13, 2007   (JP) ................................ 2007-032756
Feb. 13, 2007   (JP) ................................ 2007-032763

(51) Int. Cl.
    *F01M 1/06*      (2006.01)
(52) U.S. Cl. .................. 184/6.5; 123/196 R; 123/197.4; 384/288
(58) Field of Classification Search .................. 184/6.5; 123/196 R, 197.4; 384/288
See application file for complete search history.

(56) References Cited

U.S. PATENT DOCUMENTS

| | | | | |
|---|---|---|---|---|
| 1,497,009 A | * | 6/1924 | Bull ............................ | 184/6.5 |
| 2,289,233 A | * | 7/1942 | Beall et al. ..................... | 184/6.5 |
| 4,201,176 A | * | 5/1980 | Lustgarten ............... | 123/196 M |
| 4,258,673 A | * | 3/1981 | Stoody et al. .............. | 123/90.34 |
| 4,622,933 A | * | 11/1986 | Fukuo et al. .............. | 123/196 R |
| 5,163,341 A | * | 11/1992 | Murrish et al. ................. | 74/595 |
| 5,493,952 A | * | 2/1996 | Daniel et al. ...................... | 92/72 |
| 5,975,140 A | * | 11/1999 | Lin ............................... | 137/801 |
| 2005/0016491 A1 | * | 1/2005 | Leiber et al. ............... | 123/197.4 |
| 2005/0196084 A1 | * | 9/2005 | Kitahara et al. .............. | 384/288 |
| 2005/0263125 A1 | * | 12/2005 | Terada et al. ............. | 123/196 R |
| 2008/0025658 A1 | * | 1/2008 | Hochmayr et al. ........... | 384/457 |

FOREIGN PATENT DOCUMENTS

| | | | |
|---|---|---|---|
| FR | 2 622 922 A1 | * | 5/1989 |
| JP | 6-43202 U | | 6/1994 |
| JP | 8-2408 Y2 | | 1/1996 |

* cited by examiner

*Primary Examiner* — Thomas J. Brahan
(74) *Attorney, Agent, or Firm* — Arent Fox LLP (57) ABSTRACT

A crankshaft of an internal combustion engine has journals provided with shaft oil passages for carrying the oil to crankpins, and guide grooves having parts in which the shaft oil passages open, respectively, and opening in the cylindrical surfaces of the journals, respectively. The guide grooves has downstream end parts into which the shaft oil passages open, respectively, and extend in a circumferential direction in which the crankshaft rotates from the downstream end parts, respectively. First half bearing members of bearings are provided in their bearing surfaces with oil grooves through which the oil is supplied to the guide grooves, respectively. Each of the oil grooves are diametrically opposite to each of the guide grooves. The oil grooves have an axial width (W5) smaller than the axial width (W3) of the guide grooves. Thus oil leakage from gaps between each of the bearings and each of the journals of the crankshaft is reduced and hence an oil pump having a small capacity can be used.

9 Claims, 9 Drawing Sheets

CRANKSHAFT LUBRICATION SYSTEM

BACKGROUND OF THE INVENTION

1. Field of the Invention

The present invention relates to a crankshaft lubrication system including bearings provided with oil grooves, and a crankshaft having journals supported by and turns in the bearings and lubricated with lubricant or oil supplied through the oil grooves. The crankshaft lubrication system is incorporated into, for example, an internal combustion engine.

2. Description of the Related Art

A crankshaft lubrication system disclosed in, for example, JP-U 6-43202 includes bearings lubricated with lubricant or oil pumped out by an oil pump, and a crankshaft having journals supported by and turn in the bearings. Each of the journals is provided with a shaft oil passage through which the oil flows to a crankpin, and a guide groove into which the oil passage opens.

The guide groove extending in the rotating direction of the crankshaft increases the pressure of the oil flowing toward the crankpin, which enables the oil pump to reduce its discharge pressure and reduces power necessary for driving the oil pump.

Part of the oil flowing from the oil groove formed in the bearing supporting the journal into the guide groove leaks through the gap between the bearing and the journal. Therefore, the oil needs to be supplied at an excessively high supply rate to compensate the leakage to ensure proper lubrication of the crankpin. Thus, such leakage has been an obstacle to the reduction of the capacity of the oil pump.

A crankshaft lubrication system disclosed in, for example, JP-U 8-2408 includes a crankshaft provided with plural journals and plural crankpins, and bearings provided with oil passages for distributing the oil pumped out by an oil pump to the journals, in which only some of the journals are provided with shaft oil passage through which the oil is delivered to the crankpins.

Suppose that the journals of the crankshaft are first journals each provided with a shaft oil passage for lubricating the crankpin, and second journals not provided with any shaft oil passage. Then, the oil is supplied at an excessively high supply rate to the second journals, a large amount of the oil leaks through the gaps each between the second journal and the bearing supporting the second journal. Thus, need for compensate the leakage has been an obstacle to the reduction of the capacity of the oil pump.

The present invention has been made in view of such problems and it is therefore an object of the present invention to provide a crankshaft lubrication system capable of reducing the capacity of the oil pump by reducing the amount of leakage of the oil between the bearings and the journals of the crankshaft.

Another object of the present invention is to provide a crankshaft lubrication system capable of reducing oil leakage from journals not provided with any shaft oil passage among journals of a crankshaft and of reducing the capacity of the oil pump by reducing oil supply rate at which the oil is to be supplied to the journals not provided with any shaft oil passage

SUMMARY OF THE INVENTION

The present invention provides, to achieve the object, a crankshaft lubrication system including a crankshaft provided with plural journals and plural crankpins; bearings respectively supporting the journals and provided in inside surfaces thereof with oil grooves into which the oil pumped out by an oil pump flows; wherein at least some of the journals are provided in their cylindrical surfaces with guide grooves extending in the rotating direction of the crankshaft so as to receive the oil from the oil grooves, respectively, the crankshaft is provided with shaft oil passages connecting to the guide grooves to receive the oil from the guide grooves and to supply the oil to crankpins, and wherein each of the oil grooves and each of the guide grooves are diametrically opposite to each other, and each of the oil grooves has an axial width narrower than that of each of the guide groove.

According to the present invention, the oil pressurizing effect of the guide groove ensures supplying the oil at a necessary oil pressure to the crankpin, the axial length of a part of the bearing in sealing contact with the journal is made long because the oil passage has an axial width narrower than that of the guide groove and hence oil leakage rate at which the oil leaks through a radial gap between the bearing surface of the bearing and the journal is reduced. Therefore, the oil can be supplied to the oil grooves at a reduced supply rate, the capacity of the oil pump may be made small, and power loss attributable to the stirring of the leaking oil by the crankshaft can be reduced. Since the guide grooves makes the reduction of the discharge pressure of the oil pump and hence the leakage rate can be reduced still more.

According to the present invention, each of the bearings may be circumferentially split into a first bearing member and a second bearing member, the oil groove may be formed only in the first bearing member, and the oil groove may have a depth gradually decreasing toward circumferential ends thereof.

Thus oil leakage through a gap between joining parts of the first and the second bearing member can be suppressed and hence oil leakage through gaps each between each of the journals and each of the bearings can be reduced still more effectively. Since the depth of the oil groove decreases gradually toward the circumferential ends of the first bearing member, an oil film having gradually changing its thickness can be formed between the journal and the bearing surface of the first bearing member and the journal can be stably supported by the bearing.

Preferably, the crankshaft lubrication system of the present invention further includes an oil passage forming member having oil passages for distributing the oil pumped out by the oil pump to the oil grooves, wherein the plural journals are first journals provided with the shaft oil passages through which the oil is delivered to the crankpins and second journals not provided with any passages corresponding to the shaft oil passages, the oil passages include first oil passages for carrying oil to the first journals, and second oil passages for carrying the oil to the second journals, all the oil passages branch off from a common oil passage, and the second oil passages are provided with flow restricting means for restricting the flow of the oil flowing through the second oil passages such that the flow rate of the oil in the second oil passages is lower than that of the oil in the first oil passages.

According to this configuration, oil pressure in the gap between the second journal and the bearing is reduced by simply providing the second oil passages with the flow restricting means. Therefore, the oil can be supplied to the second journals not provided with the shaft oil passage for carrying the oil to the crankpin at a flow rate lower than that at which the oil is supplied to the first journal provided with the shaft oil passage. Consequently, supply of the oil at a necessary supply rate to the crankpins can be ensured, the leakage of the oil through the gap between the second journal and the bearing decreases, the capacity of the oil pump can be reduced, and power loss attributable to the stirring of the leaked oil by the crankshaft can be reduced Preferably, the second journals include end journals disposed at the axial ends of the axial row of the plural journals, and intermediate journals arranged between the end journals, and the flow restricting means are adjusted such that an oil supply rate at which the oil is supplied to the intermediate journals is lower than that at which the oil is supplied to the end journals.

Thus the oil is supplied at a high oil supply rate to the heavily loaded end journals, and the oil is supplied at a low oil supply rate to the lightly loaded intermediate journals. Thus the oil can be supplied to the second journals respectively at optimum oil supply rates, and the leakage of the oil through the gap between each second journal and the bearing can be reduced still more effectively.

Typically, the flow restricting means is a narrow part of a reduced diameter in the second oil passage.

DESCRIPTION OF THE PREFERRED EMBODIMENTS

Preferred embodiments of the present invention will be described with reference to FIGS. 1 to 10.

Figure 1:
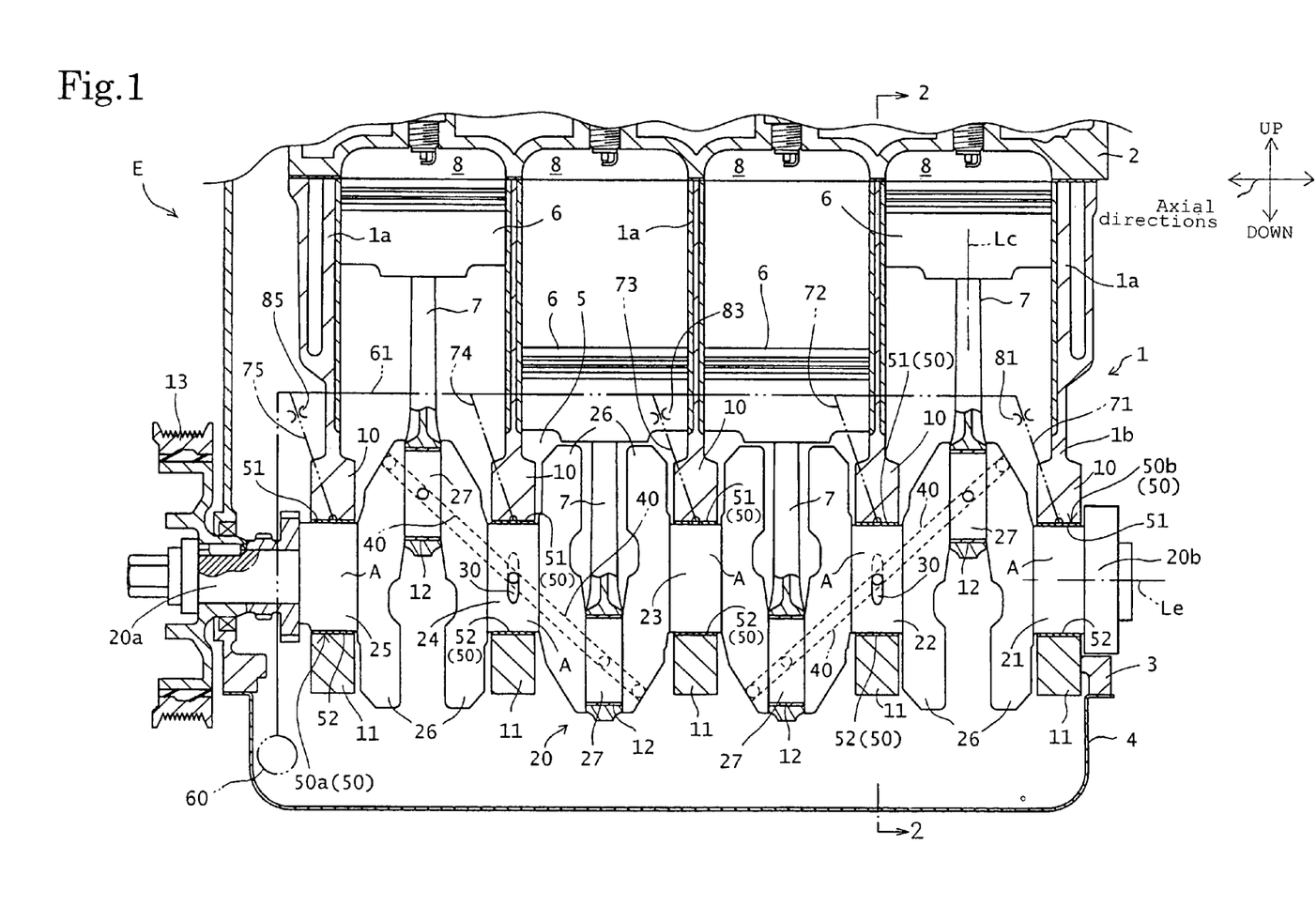
FIG. 1 is a sectional view of an essential part of an internal combustion engine provided with a crankshaft lubrication system in a preferred embodiment of the present invention, taken on a plane parallel to cylinder axes and containing the center axis of a crankshaft of the internal combustion engine.

Referring to FIG. 1, a crankshaft lubrication system in a preferred embodiment of the present invention is incorporated into an automotive internal combustion engine E. The internal combustion engine E is an in-line 4-cylinder internal combustion engine. The engine E includes a cylinder block 1 provided with four cylinders 1a, a cylinder head 2 joined to an upper part of the cylinder block 1, a lower block 3 joined to a lower part 1b of the cylinder block 1, and an oil pan 4 joined to the lower surface of the lower part 1b of the cylinder block 1. The lower part 1b of the cylinder block 1, the lower block 3 and the oil pan 4 form a crankcase defining a crank chamber 5. A crankshaft 20 is supported for rotation in the crank chamber 5.

In this specification, the terms "axial direction", "diametrical direction" and "circumferential direction" signify a direction parallel to the center axis $L_e$ of the crankshaft 20, a direction parallel to a diameter of a circle having its center on the center axis $L_e$, and a direction parallel to a tangent to a circle having its center on the center axis $L_e$, respectively.

As shown in FIG. 1, directions parallel to the center axis $L_c$ of the cylinders 1a are vertical directions, and directions parallel to the axial direction are transverse directions. When the rightward direction is a first axial direction (a second axial direction), the leftward direction is a second axial direction (first axial direction).

A piston 6 fitted for reciprocation in each cylinder 1a is connected to the crankshaft 20 by a connecting rod 7. The crankshaft 20 is supported for rotation by five bearings 50 on the lower part 1b of the cylinder block 1. The pistons 6 are driven by the pressure of a combustion gas generated through the combustion of an air-fuel mixture in combustion chambers 8 formed in the cylinder head 2 to drive the crankshaft 20 for rotation.

Each bearing 50 is held by a bearing wall 10, namely, a holding part, formed integrally with the lower part 1b, and a bearing cap 11, namely, a lower holding member, fastened to the bearing wall 10 with bolts. Each bearing 50 is held by bearing holding members, namely, the bearing wall 10 and the bearing cap 11, the bearing holding members are united to the lower part 1b of the cylinder block 1. Lubricant or oil pumped out by an oil pump 60 driven by the crankshaft 20 is supplied to the bearings 50.

The crankshaft 20 has five journals 21 to 25, pairs of crank webs 26 formed between the journals 21 and 22, between the journals 22 and 23, between the journals 23 and 24 and between the journals 24 and 25, respectively, and four crankpins 27 extended between the pairs of crank webs 26, respectively. The large end of each connecting rod 7 is connected to the crankpin 27 with a connecting-rod bearing 12 held between the large end of the connecting rod 7 and the crankpin 27 such that the large end of the connecting rod 7 and the crankpin 27 can turn relative to each other. The crankshaft 20 is a unitary shaft integrally including the journals 21 to 25, the crank webs 26 and the crankpins 27.

The journals 21 and 25 among the five journals 21 to 25 are end journals at the axially opposite ends, respectively, of the arrangement of the journals 21 to 25. The journals 22 to 24 are intermediate journals 22 to 24 arranged between the end journals 21 and 25.

A first end part 20a of the crankshaft 20 projects to the left from the end journal 25. A crankshaft pulley 13 is mounted on the first end part 20a of the crankshaft 20. The crankshaft pulley 13 is included in a transmission mechanism for transmitting the power of the internal combustion engine E to accessories including an alternator of the internal combustion engine E. A second end part 20b of the crankshaft 20 projects to the right from the end journal 21. A clutch, not shown, is mounted on the second end part 20b of the crankshaft 20. The clutch is engaged to transmit power from the internal combustion engine E to a transmission, namely, a mechanism driven by the internal combustion engine E. The clutch is disengaged to stop delivering power from the internal combustion engine E to the transmission.

A crankshaft lubrication system including the bearings 50 and the crankshaft 20 will be described.

Figure 2:
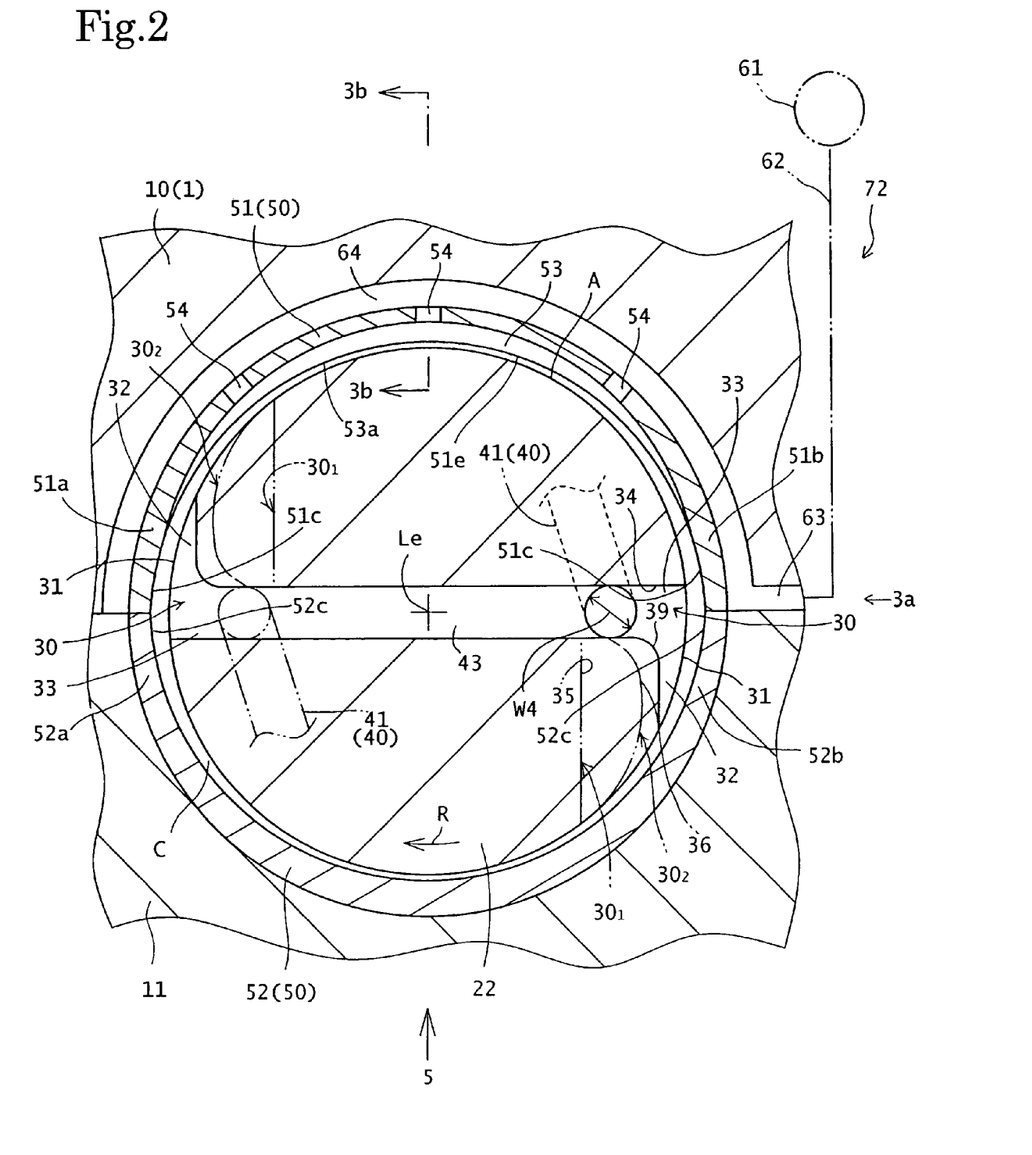
FIG. 2 is a sectional view taken on the line 2-2 in FIG. 1.
Figure 3:
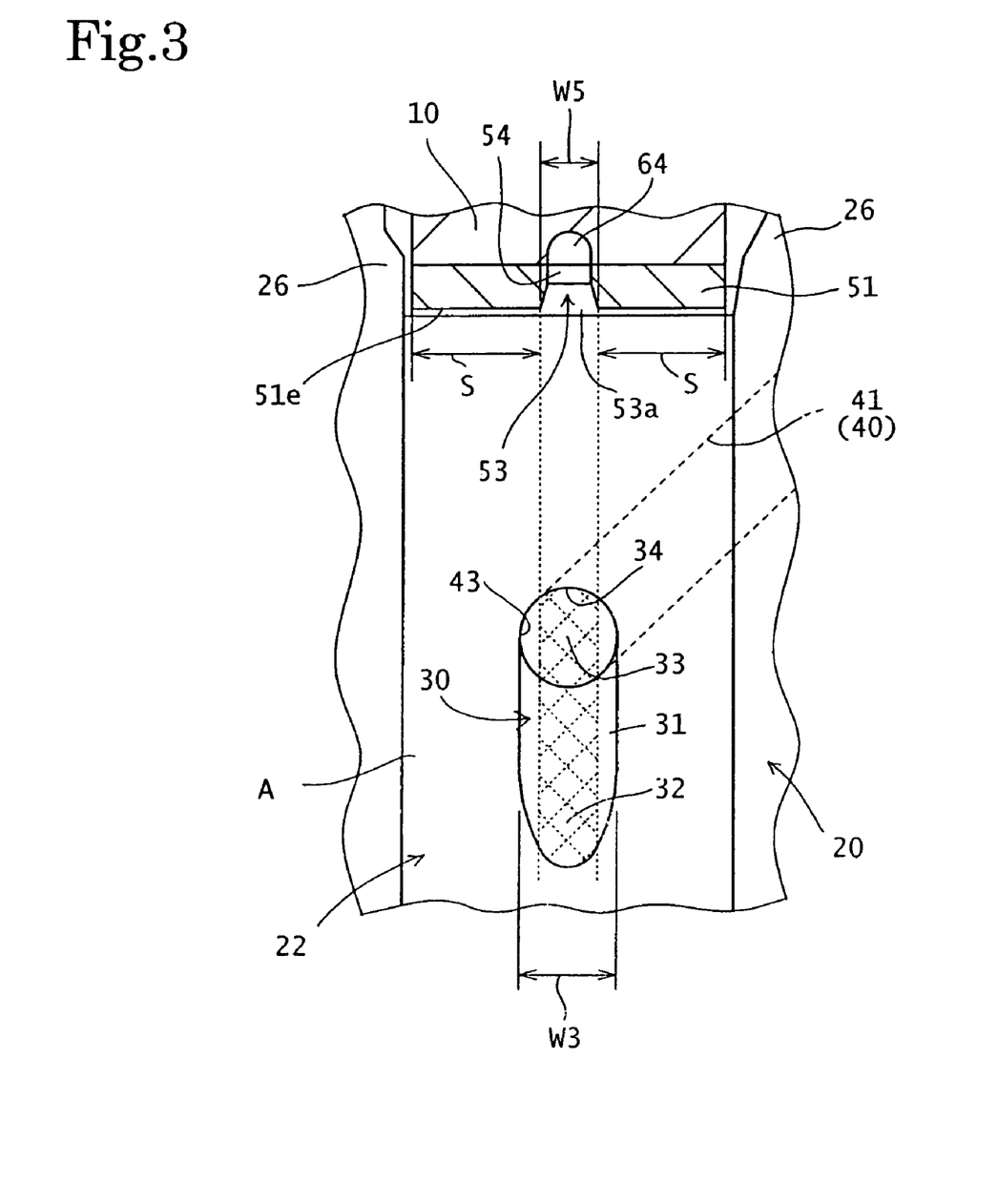
FIG. 3 is a view taken in the direction of the arrow 3a in FIG. 2, in which bearings are shown in a sectional view taken on the line 3b-3b in FIG. 2.

Referring to FIGS. 1 to 3, the journals 21 to 25 are classified into first journals each provided with two shaft oil passages 40, and second journals not provided with the shaft oil passages 40. The two intermediate journals 22 and 24 are first journals, and the three journals 21, 23 and 25 are second journals. Each of the first journals 22 and 24 is provided with the two shaft oil passages 40 extending to the crankpins 27, respectively, a connecting oil passage 43 connecting the two shaft oil passages 40, and two guide grooves 30 connecting to the open ends of the two shaft oil passages 40, respectively. The three second journals are the two end journals 21 and 25 and the one intermediate journal 23. The shaft oil passages 40 extend obliquely to the center axis $L_e$ of the crankshaft 20.

Figure 4:
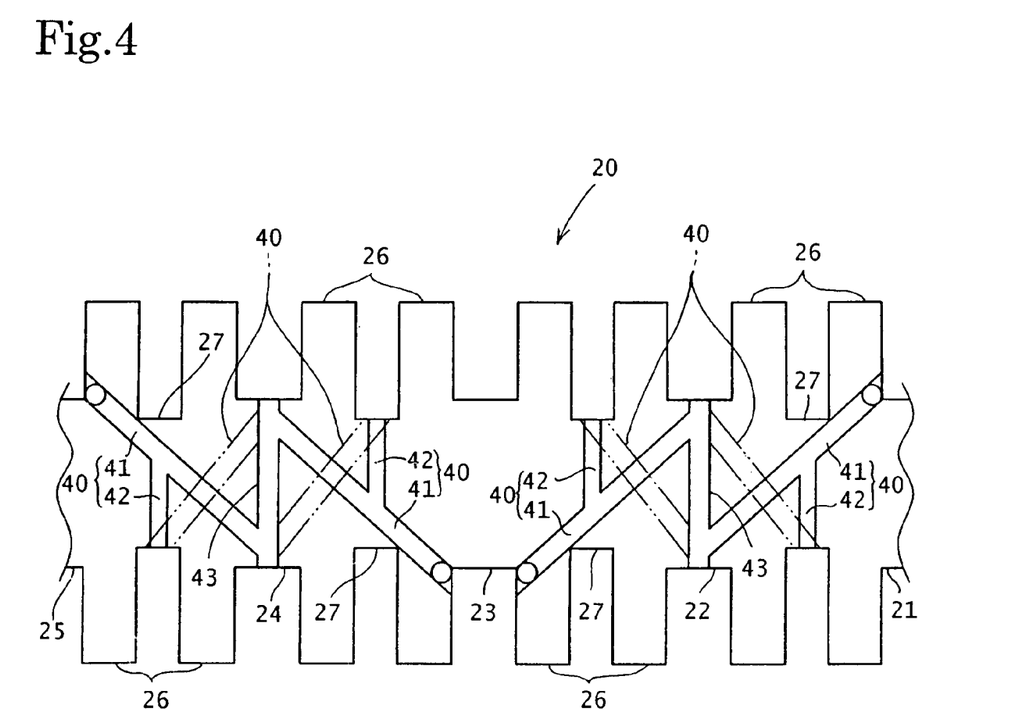
FIG. 4 is a schematic top view of the crankshaft showing shaft oil passages in a first arrangement.

Referring also to FIG. 4, each of the shaft oil passages 40 formed in the crankshaft 20 has an upstream shaft oil passage 41 opening into the guide groove 30, and a downstream shaft oil passage 42 connecting to the upstream shaft oil passage 41 and opening into a space surrounding the crankpin 27. FIG. 4 shows the upstream shaft oil passages 41 and the downstream shaft oil passages 42 in a schematic view. As best shown in FIG. 2, the two shaft oil passages 40 formed in each of the journals 22 and 24 are connected by a straight connecting oil passage 43 intersecting the center axis $L_e$. The upstream shaft oil passages 41 and the downstream shaft oil passages 42 are straight holes of a circular cross section formed by machining, such as drilling. The upstream shaft oil passages 41 and the downstream shaft oil passages 42 carry the oil that has flowed through the guide grooves 30 to the crankpins 27. The oil delivered to the crankpins 27 sprays into the crank chamber 5 after lubricating the bearings 12 to lubricate parts disposed in the crank chamber 5 and requiring lubrication.

Referring to FIGS. 2 and 3, the guide groove 30 has an open end 31 opening in a middle part, with respect to the axial direction, of the cylindrical surface A of each of the journals 22 and 24. The guide groove 30 has a downstream end part 33 into which the upstream shaft oil passage 41 opens, and an upstream end part 32 on the upstream side of the downstream end part 33 with respect to the rotating direction R of the crankshaft 20. The guide groove 30 extends in the rotating direction R of the crankshaft 20 from the downstream end part 33 blocked by a diametrically extending wall surface 34. The open part 31 opens into the downstream end part 33 and the upstream end part 32.

The guide groove 30 has depth gradually decreasing in the rotating direction R of the crankshaft 20, and passage area gradually increasing in a direction opposite the rotating direction R. A maximum of the width W3, namely, an axial dimension, of the guide groove 30 is substantially equal to the diameter W4 of the inlet of the shaft oil passage 41 opening into the guide groove 30. The maximum of the width W3 is equal to the axial width of the open part 31.

While the crankshaft 20 is in rotation, the oil filling a gap C (FIG. 2) surrounding the cylindrical surface A flows through the upstream end part 32 of the open part 31 into each guide groove 30 and flows through the guide groove 30 toward the downstream end part 33. Since the passage area of the guide groove 30 increases gradually toward the downstream end part 33, the velocity of the oil in the guide groove 30 decreases as the oil flows from the upstream end part 32 toward the downstream end part 33. Consequently, the dynamic pressure of the oil decreases and the static pressure of the same increases. The pressure of the oil in the downstream end part 33 is higher than those in the gap C and the upstream end part 32. The oil of an elevated static pressure flows through the shaft oil passage 40 to the crankpin 27 (FIG. 1). The dynamic pressure of the oil that has flowed into the guide groove 30 is caused to decrease and the static pressure of the same is caused to increase by the pressurizing effect of the guide groove 30 as the oil flows through the guide groove 30. Consequently, the oil of an elevated pressure flows into the shaft oil passage 40. Any oil passages other than the guide groove 30 are not formed in the cylindrical surface A.

Each bearing 50 is held in a cylindrical bearing hole defined by the bearing wall 10 and the bearing cap 11 and is restrained from axial and circumferential movement. Each bearing 50 is a cylindrical split plane bearing of a bearing metal. The bearing 50 is split circumferentially into a semi-cylindrical first half bearing member 51 and a semi-cylindrical second half bearing member 52.

Referring to FIG. 2, each bearing 50 is completed by joining the respective circumferential ends 51a and 52a, and the respective circumferential ends 51b and 52b of the half bearing members 51 and 52 together. The thus completed bearing 50 is held by the bearing wall 10 and the bearing cap 11. The circumferential ends 51a and 52a, and the circumferential ends 51b and 52b are shaped so as to form crush relieves 51c and 52c, respectively. The crush relieves 51c and 52c increase the radial dimensions of parts of the gap C near the circumferential ends 51a and 52a and the circumferential ends 51b and 52b. Thus the crush relieves 51c and 52c prevent interference between the circumferential ends 51a, 52a, 51b and 52b, and each of the journals 21 to 25 when parts of the circumferential ends 51a, 52a, 51b and 52b protrude inward due to errors in attaching the bearing cap 11 to the bearing wall 10.

Figure 5:
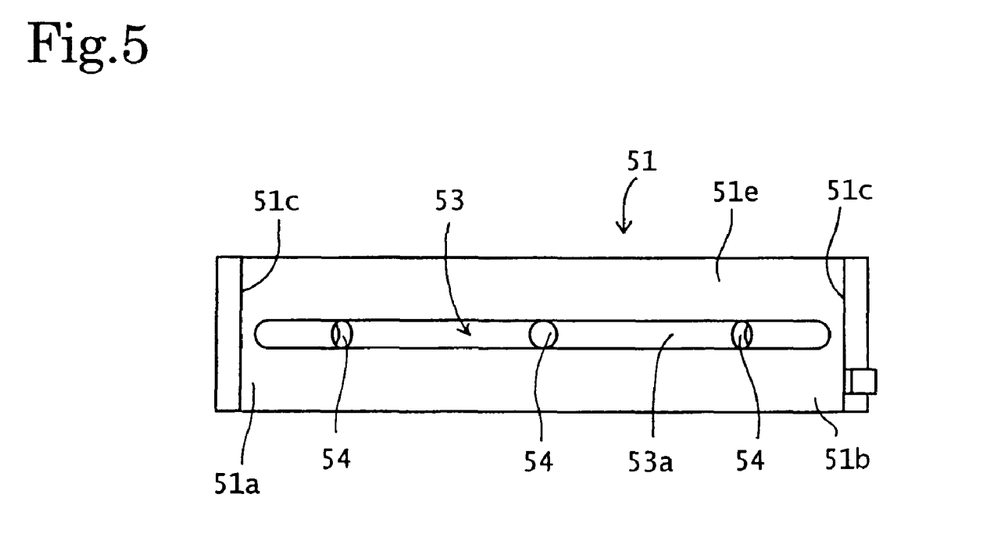
FIG. 5 is a view of a bearing member of a bearing taken in the direction of the arrow 5 in FIG. 2.

Referring to FIG. 5, only the first half bearing members 51 of the bearings 50 supporting the journals 21 to 25 are provided respectively with arcuate oil grooves 53 for carrying the oil to the journals 21 to 25, and oil ports 54 (three oil ports, for example) through which the oil flows into the oil groove 53 are formed in each of the first half bearing members 51. The second half bearing members 52 are not provided with any oil passages and oil ports for delivering the oil into the gaps C. The oil port 54 extends radially through the first half bearing member 51 and opens in the outside surface of the first half bearing member 51 and into the oil groove 53. The oil ports 54 are arranged at equal angular intervals.

The first half bearing member 51 has an inside surface serving as a bearing surface 51e facing the cylindrical surface A of the corresponding one of the journals 21 to 25. The oil groove 53 is formed in a middle part, with respect to the axial direction, of the bearing surface 51e. The oil groove 53 has an opening 53a opening in the bearing surface 51e. The oil groove 53 corresponds diametrically to the guide groove 30. The oil flows from the oil passage 53 into the guide groove 30. The oil groove 53 is formed in the first half bearing member 51 excluding the circumferential ends 51a and 51b. The oil groove 53 has depth gradually decreasing toward the circumferential ends 51a and 51b.

As shown in FIG. 3, the width W5, namely, the axial dimension, of the oil groove 53 is smaller than the width W3, namely, the axial dimension, of the guide groove 30. The oil groove 53 is included in an axial range in which the guide groove 30 is formed. The width W5 is the axial dimension of the opening 53a. The sealing length S, i.e., the axial length of parts of the first half bearing member 51 contiguous with each one of the journals 22 and 24 (FIG. 1) is made longer than that when the width W5 of the oil groove 53 is greater than the width W3 of the guide groove 30. Thus the leakage of the oil through the gaps between the first half bearing members 51 and the corresponding journals can be suppressed. The width W5 of the oil groove 53 is determined such that a minimum of a transfer area, namely, the area of a shaded part in FIG. 3 as viewed in a diametrical direction, in which the oil groove 53 and the guide groove 30 overlap each other and the oil is delivered directly from the oil groove 53 to the guide groove 30, is greater than the passage area of the shaft oil passage 40. Thus a sharp increase of pressure loss resulting from the reduction of the width W5 of the oil groove 53 can be prevented and the supply of the oil at a necessary supply rate to the crankpins 27 (FIG. 1) can be ensured.

Referring to FIGS. 1 and 2, the oil pumped out by an oil pump 60 into a main gallery 61 flows through out-bearing oil passages formed in the bearing walls 10 and the cylinder block 1 into in-bearing oil passages including the oil grooves 53 and the oil ports 54 of the bearings 50. The five out-bearing oil passages for carrying the oil pumped out by the oil pump 60 to the bearings 50 are branched off from the main gallery 61, namely, a common oil passage.

As shown in FIG. 2, each of the out-bearing oil passages has a semicircular oil groove 64 formed in the bearing Wall 10 and opening toward the cylindrical surface A, an oil groove 63 formed in the bearing wall 10 and contiguous with a joining surface of the bearing cap 11, and an oil passage 62 formed in the cylinder block 1.

The oil flows from the main gallery 61 through the oil passages 62, the oil passages 63, the oil passages 64, the oil ports 54 into the oil grooves 53. Then the oil flows from the oil grooves 53 through the guide grooves 30 into gaps C extending between the half bearing members 51 and 52 and the corresponding journals 21 to 25. The in-bearing oil passages each including the oil groove 53 and the oil ports 54, and the out-bearing oil passages each including the oil passages 62, 63 and 64 form oil passages 71 to 75 respectively for carrying the oil to the journals 21 to 25. The bearings 50 each provided with the oil groove 53 and the oil ports 54, and the cylinder block 1 and the bearing walls 10 provided with the oil passages 62, 63 and 64 are oil passage forming members supporting the crankshaft 20 for rotation and provided with the five oil passages 71 to 75. The five oil passages 71 to 75 are classified into first oil passages 72 and 74 for delivering the oil to the journals 22 and 24 provided with the shaft passages 40, and second oil passages 71, 73 and 75 for delivering the oil to the journals 21, 23 and 25 not provided with any passage corresponding to the shaft oil passages 40.

An oil supply rate at which the oil needs to be supplied to the journals 21, 23 and 25 not provided with any oil passages like the shaft oil passages of the journals 22 and 24 may be lower than that at which the oil needs to be supplied to the journals 22 and 24. Therefore, the flow rate of the oil in the oil passages 71, 73 and 75 is lower than that of the oil in the oil passages 72 and 74. As shown in FIG. 1, orifice bushings 81, 83 and 85, namely, flow restricting means, are placed at least either of the in-bearing oil passages and the out-bearing oil passages of the oil passages 71, 73 and 75, respectively, to restrict the flow of the oil flowing toward the journals 21, 23 and 25. In this embodiment, the orifice bushings 81, 83 and 85 are placed in the oil passages 62 of the out-bearing oil passages, respectively.

A comparatively large bending force acts on the first end part 20a and the second end part 20b of the crankshaft 20. The end journals 21 and 25 are heavy-load journals loaded with heavy load, and the intermediate journals 22, 23 and 24 are light-load journals loaded with light load. The oil is supplied to the bearings 50a and 50b supporting the end journals 25 and 21 adjacent to the first end part 20a and the second end part 20b, respectively, at a supply rate higher than that at which the oil is supplied to the bearings 50 supporting the journals 22 to 24 to suppress the wear of the bearings 50a and 50b. Therefore, the diameter of the aperture of the orifice bushing 83 is smaller than those of the apertures of the orifice bushings 81 and 85 to restrict the flow of the oil in the oil passage 73 more severely than that of the oil in the oil passages 71 and 75. Thus, the oil is supplied to the journals 21 and 25 at a supply rate higher than that at which the oil is supplied to the journal 23.

The oil may be supplied to the end journals 21 and 25 at the same supply rate or may be supplied at different supply rates according to loads on the end journals 21 and 25, respectively.

The effect and operation of the crankshaft lubrication system in this embodiment will be described.

The journals 21 to 25 are provided with the guide grooves 30 opening into the in-bearing oil passages 40 for carrying the oil to the crankpins 27. The bearing surfaces 51e of the bearings 50 are provided with the oil grooves 53 for carrying the oil to the guide grooves 30 of the journals 21 to 25. The guide grooves 30 extends, in the rotating direction R of the crankshaft 20, from the down-stream end parts 33 into which the in-bearing oil passages 40 open. The oil grooves 53 and the guide grooves 30 are opposite to each other with respect to a diametrical direction, respectively. The width W5 of the oil grooves 53 is smaller than the width W3 of the guide grooves 30. Based on the above configuration, the oil pressurizing effect of the guide grooves 30 ensures supplying the oil at a necessary oil pressure to the crankpin 27. The axial length S of parts of the bearings 50 in sealing contact with the journals 22 and 24 is made long because the oil passages 53 have the width W5 narrower than the width W3 of the guide grooves 30 and hence oil leakage rate at which the oil leaks through the radial gaps each between the bearing surface 51e of the bearing 50 and each of the journals 22 and 24, is reduced. Therefore, the oil can be supplied to the oil grooves 52 at a reduced supply rate, the capacity of the oil pump 60 may be made small, power loss attributable to the stirring of the leaked oil by the crankshaft 20 can be reduced and the output of the internal combustion engine E is improved. Since the guide grooves 30 makes the reduction of the discharge pressure of the oil pump 60 and hence the leakage rate can be reduced still more.

Figure 6:
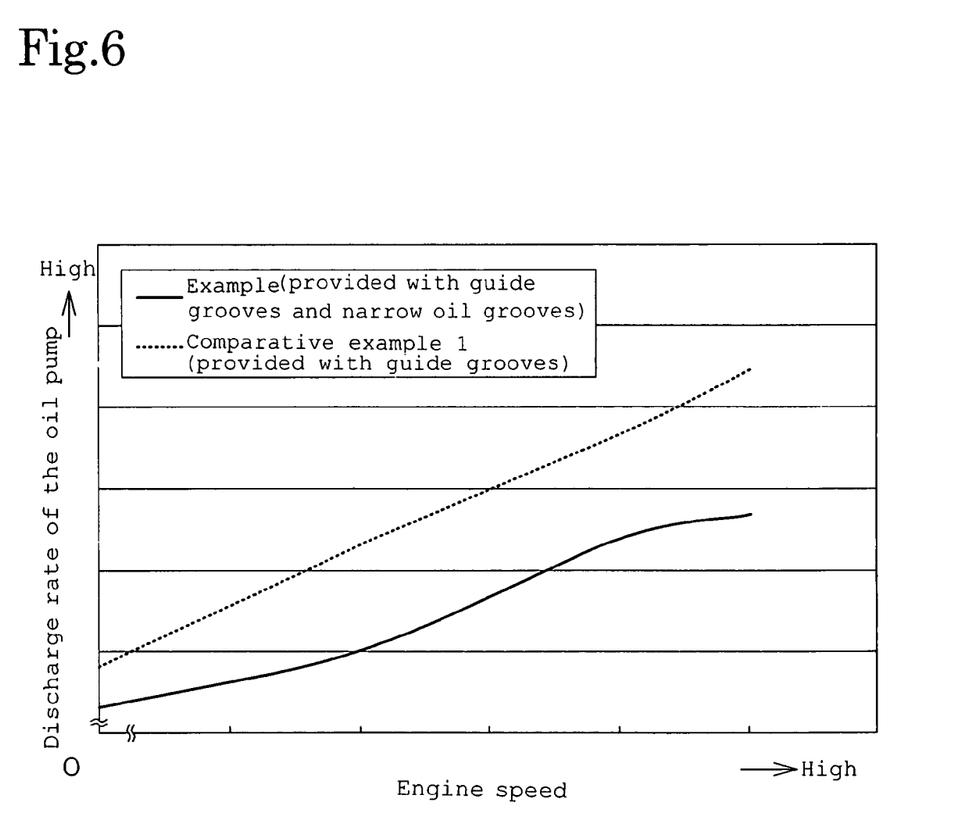
FIG. 6 is a graph showing variation of the discharge rate of an oil pump with engine speed.

A crankshaft lubrication system in a comparative example 1 is provided with guide grooves 30 having an axial width W3 and oil passages 53 having an axial width W5 equal to the width W3. As shown in FIG. 6 by way of example, a necessary supply rate at which the oil pump 60 of the crankshaft lubrication system of the present invention needs to supply the oil while the internal combustion engine is operating at engine speeds in a middle and a high engine speed range is lower than that at which the crankshaft lubrication system in comparative example 1 needs to supply the oil. This supply rate reducing effect of the crankshaft lubrication system of the present invention tends to increase with the increase of engine speed.

Figure 7:
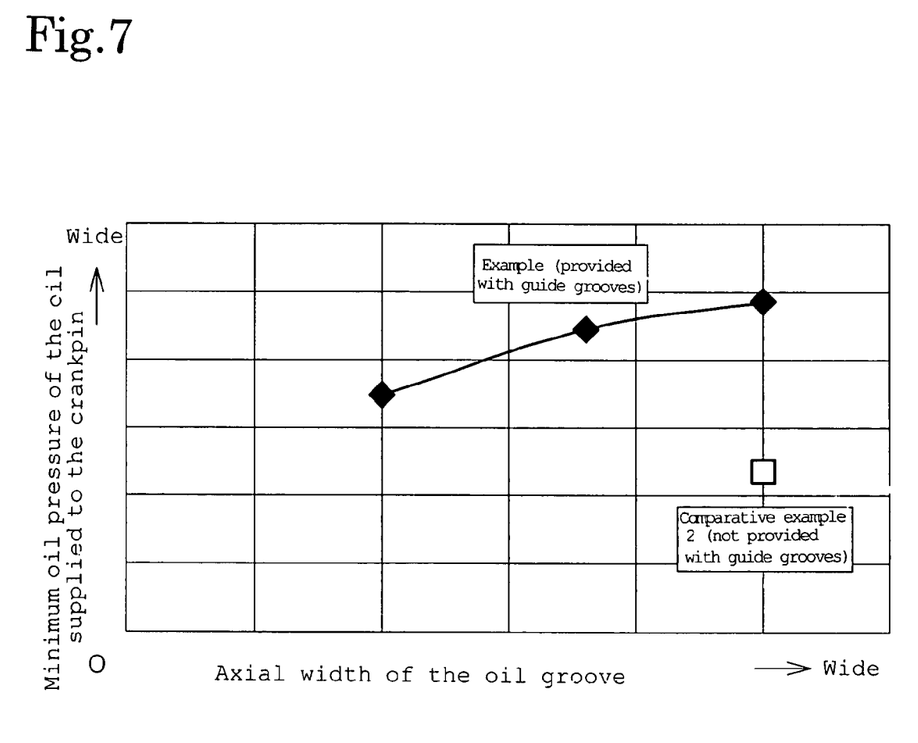
FIG. 7 is a graph showing the dependence of a minimum oil pressure of the oil supplied to a crankpin on the axial width of an oil groove.

As shown in FIG. 7, in the crankshaft lubrication system of the present invention, which has the guide grooves 30 and the oil grooves 53 of the reduced axial width W5 to reduce oil leakage, the lowest oil pressure supplied to the crankpins is higher than that in a crankshaft lubrication system in comparative example 2 which is not provided with any grooves corresponding to the guide grooves 30. Therefore, the necessary supply rate can be reduced by lowering the discharge pressure and hence the capacity of the oil pump 60 may be reduced.

Each of the bearings 50 is split into the half bearing members 51 and 52, and the oil groove 53 is formed only in the first half bearing member 51, the depth of the oil groove 53 decreases gradually toward the circumferential ends 51a and 51b of the half bearing member 51. Thus leakage of the oil through a gap between the joining parts of the first half bearing member 51 and the second half bearing member 52 can be suppressed and hence the leakage of the oil through gaps each between each of the journals 21 to 25 and each of the bearings can be reduced still more effectively. Since the depth of the oil groove 53 decreases gradually toward the circumferential ends 51a and 51b of the first half bearing member 51, an oil film having gradually changing thickness can be formed between each of the journals 21 to 25 and each of the bearing surfaces of each of the first half bearing members 51 and hence the journals 21 to 25 can be stably supported by the bearings 50

In the crankshaft lubrication system, the crankshaft 20 has the journals 22 and 24 provided with the shaft oil passages 40 for carrying the oil to the crankpins 27 and the journals 21, 23 and 25 not provided with any oil passages corresponding to the oil passages 40, the oil is supplied through the oil passages 72 and 74 to the journals 22 and 24, and the oil is supplied through the oil passages 71, 73 and 75 to the journals 21, 23 and 25. All the oil passages 71 to 75 are connected to the main gallery 61. the oil passages 71, 73 and 75 are provided with the orifice bushings 81, 83 and 85 to reduce the supply rate at which the oil is supplied through the oil passages 71, 73 and 75 below that at which the oil is supplied through the oil passages 72 and 74. The pressure of the oil in the gaps each between each of the journals 21, 23 and 25 and each of the bearings 50 can be reduced simply by providing the oil passages 71, 73 and 75 with the orifice bushings 81, 83 and 85, respectively, to supply the oil to the journals 21, 23 and 25 not provided with any oil passages corresponding to the shaft oil passages 40 at a supply rate lower than that at which the oil is supplied to the journals 22 and 24 provided with the shaft oil passages 40. Therefore, the supply of the oil at a necessary supply rate to the crankpins 27 can be ensured, oil leakage from the journals 21, 23 and 25 can be reduced and hence the capacity of the oil pump 60 can be reduced.

The journals 21 to 25 includes the journals 21, 23 and 25 not provided with any oil passages corresponding to the shaft oil passages 40, and the end journals 21 and 25 are at the opposite ends of the axial arrangement of the journals 21 to 25, and the intermediate journals 22 to 24 are arranged between the end journals 21 and 25. The oil is supplied to the intermediate journals 22 to 24 at a supply rate lower than that at which the oil is supplied to the end journals 21 and 25. The oil is supplied at an increased supply rate to the heavily loaded end journals 21 and 25 and at a reduced supply rate to the lightly loaded intermediate journals 22 to 24. Thus the oil is supplied at an optimum supply rate to the journals 21, 23 and 25 not provided with any oil passages corresponding to the shaft oil passages 40 and oil leakage from the journals 21, 23 and 25 can be reduced still more effectively.

Changes made to a crankshaft lubrication system in a modification of the foregoing embodiment will be described, in which parts like or corresponding to those of the foregoing embodiment are designated by the same reference characters.

A guide groove $30_1$ indicated by two-dot chain lines in FIG. 2 may be formed in an increased depth such that the bottom surface 35 of the guide groove $30_1$ is on the side of the center axis $L_e$ relative to the shaft oil passage 40. The guide groove $30_1$ of such a depth reduces pressure loss therein and can increase oil pressure in a downstream part of the guide groove $30_1$.

Omission of work for forming a part 39 (FIG. 2) near the junction of the shaft oil passage 40 and the guide groove 30 in a smoothly curved shape can reduce the cost.

A guide groove $30_2$ indicated by two-dot chain lines in FIG. 2 may have a radially outward convex, smoothly curved bottom surface 36. The guide groove $30_2$ having the bottom surface 36 reduces pressure loss in the guide groove $30_2$ and increases oil pressure in a downstream part of the guide groove $30_2$.

Figure 8A:
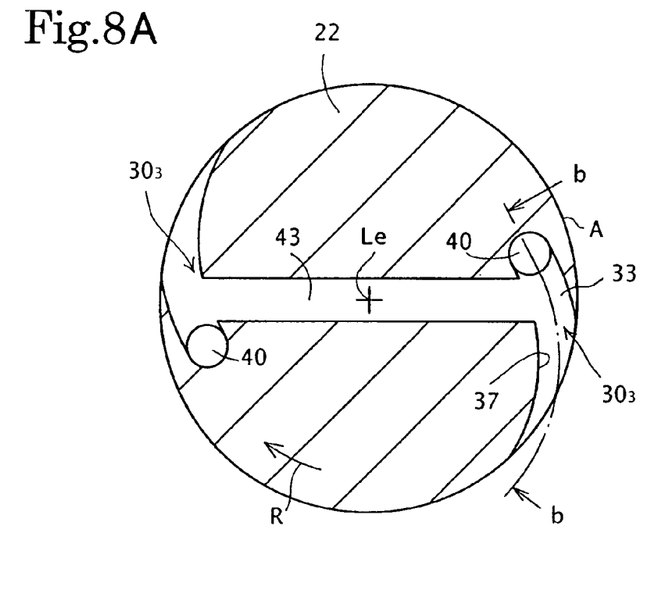
FIG. 8A is a sectional view of a guide groove in a first modification of a guide groove formed in a journal of the crankshaft of the internal combustion engine shown in FIG. 1.
Figure 8B:
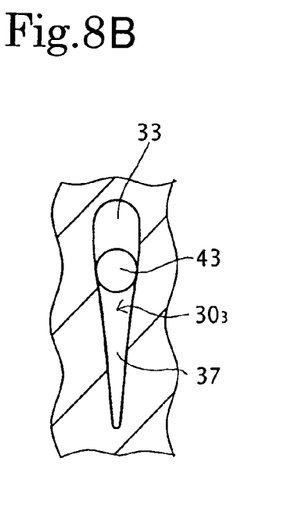
FIG. 8B is a sectional view taken on the line b-b in FIG. 8A.

Referring to FIGS. 8A and 8B, a guide groove $30_3$ has a downstream end part 33 underlying part of the cylindrical surface A. Since the effluence of the oil from the downstream end part 33 of the guide groove $30_3$ can be prevented, the dynamic pressure of the oil in the guide groove $30_3$ can be efficiently used and oil pressure can be increased. Since the guide groove $30_3$ has a radially outward convex, curved bottom surface 37 smoothly merging into the cylindrical surface A of the journal 22, the oil wetting the cylindrical surface A can smoothly flow into the guide groove $30_3$. Consequently, pressure loss is reduced and oil pressure in a downstream end part 33 can be increased.

Figure 9A:
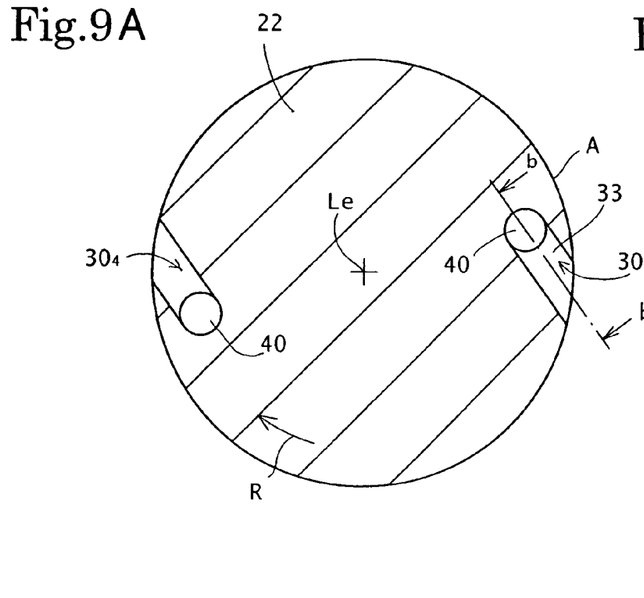
FIG. 9A is a sectional view of a guide groove in a second modification of a guide groove formed in a journal of the crankshaft of the internal combustion engine shown in FIG. 1.
Figure 9B:
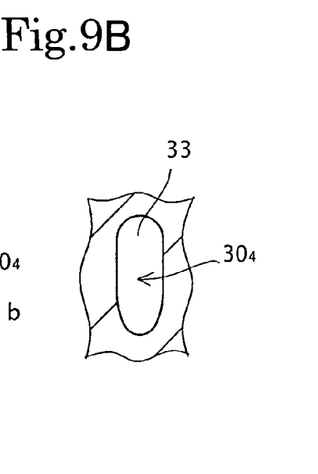
FIG. 9B is a sectional view taken on the line b-b in FIG. 9A.

Referring to FIGS. 9A and 9B, a guide groove 304 has a downstream end part 33 underlying part of the cylindrical surface A and having the shape of a straight hole. The guide groove 304 reduces the cost. The connecting oil passage 43 (FIG. 2) connecting the two shaft oil passages 40 may be omitted.

Figure 10:
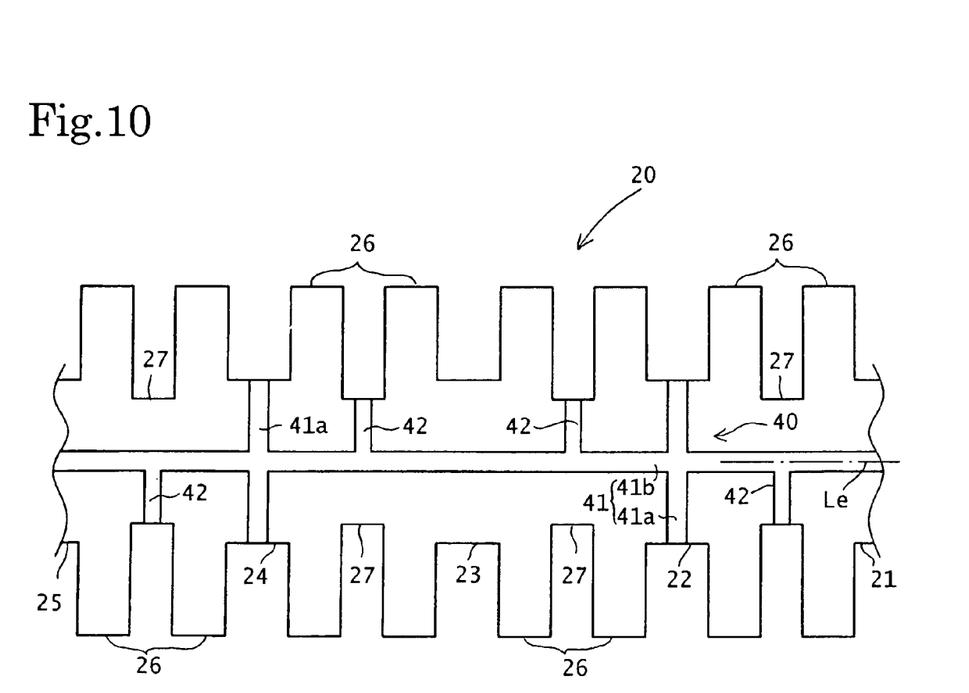
FIG. 10 is a schematic top view of the crankshaft showing shaft oil passages in a second arrangement.

The straight shaft oil passages 40 may open into the cylindrical surfaces of the crankpins 27 as indicated by two-dot chain lines in FIG. 4. As shown in FIG. 10, the upstream shaft oil passage 41 of the shaft oil passage 40 may have a radial oil passage 41a perpendicular to the center axis $L_e$ and an axial oil passage 41b aligned with the center axis $L_e$, and the downstream shaft oil passage 42 may be extended from the axial oil passage 41b.

The following flow restricting means may be employed.

The oil ports 54 of the bearings 50 supporting the three second journals 21, 23 and 25 are formed in a small or reduced diameter.

The second oil passages 71 73 and 75 are formed in a passage area smaller than that of the first oil passages 72 and 74 by forming the second oil passages 71, 73 and 75 by holes of a small diameter or conduits of a small inside diameter.

The internal combustion engine E may be a V-type engine, such as a V-6 or a V-8 engine.

Although the invention has been described on an assumption that the internal combustion engine E is an automotive internal combustion engine, the present invention is applicable to a marine propulsion apparatus, such as an outboard motor provided with a vertical crankshaft.

The crankshaft lubrication system of the present invention is applicable to machines other than internal combustion engines.

What is claimed is:

1. A crankshaft lubrication system comprising:
   a crankshaft provided with plural journals and plural crankpins; and
   bearings respectively supporting the journals and provided in inside surfaces thereof with oil grooves into which oil pumped out by an oil pump flows;
   wherein at least some of the journals are provided in their cylindrical surfaces with guide grooves extending in a rotating direction of the crankshaft so as to receive the oil from the oil grooves, respectively, the crankshaft is provided with shaft oil passages connecting to the guide grooves to receive the oil from the guide grooves and to supply the oil to crankpins; and
   wherein each of the oil grooves and each of the guide grooves are diametrically opposite to each other, and each of the oil grooves has an axial width narrower than that of each of the guide grooves.

2. The crankshaft lubrication system according to claim 1, wherein each of the bearings is circumferentially split into a first bearing member and a second bearing member, the oil groove is formed only in the first bearing member, and the oil groove has a depth gradually decreasing toward circumferential ends thereof.

3. The crankshaft lubrication system according to claim 1, wherein the journals are provided with connecting oil passages intersecting axes thereof and extending through the journals, respectively, the guide grooves are formed at opposite ends of each of the connecting oil passages, respectively, and the shaft oil passages are connected to parts adjacent to the opposite ends of the connecting oil passage, respectively.

4. The crankshaft lubrication system according to claim 1, wherein each of the journals is provided with the guide grooves in parts at opposite ends of a line intersecting its axis, respectively, and the shaft oil passage is connected to the guide grooves.

5. The crankshaft lubrication system according to claim 1, further comprising an oil carrying member forming oil passages for distributing the oil pumped out by the oil pump to the oil grooves;
wherein the plural journals are first journals provided with the shaft oil passages through which the oil is delivered to the crankpins, and second journals free from any passages corresponding to the shaft oil passages, the oil passages include first oil passages for carrying the oil to the first journals, and second oil passages for carrying the oil to the second journals, all the oil passages branch off from a common oil passage, and the second oil passages are provided with flow restricting means for restricting the flow of the oil flowing through the second oil passages such that flow rate of the oil in the second oil passages is lower than that of the oil in the first oil passages.

6. The crankshaft lubrication system according to claim 5, wherein the second journals are end journals respectively at the axial ends of the axial row of the plural journals, and intermediate journals disposed between the end journals, and the flow restricting means are adjusted such that an oil supply rate at which the oil is supplied to the intermediate journals is lower than that at which the oil is supplied to the end journals.

7. The crankshaft lubrication system according to claim 5, wherein the flow restricting means are formed by parts of a reduced diameter in the second oil passages.

8. The crankshaft lubrication system according to claim 5, wherein the oil passage forming member holds bearings for supporting the second journals, the bearings are provided with oil holes connected to the second oil passages, and the flow restricting means are parts of the oil holes formed in a diameter smaller than that of the oil passages.

9. The crankshaft lubrication system according to claim 5, wherein the oil passage forming member holds bearings for supporting the second journals, the bearings are provided with oil holes connected to the second oil passages, and oil grooves connecting to the oil holes and circumferentially extending oil grooves formed in the inside surface of the bearings, respectively, and the flow restricting means are parts of the oil grooves formed in a width smaller than that of the oil grooves.

* * * * *